United States Patent
Toyama

(10) Patent No.: US 11,131,593 B2
(45) Date of Patent: Sep. 28, 2021

(54) SENSOR DEVICE

(71) Applicant: JTEKT CORPORATION, Osaka (JP)

(72) Inventor: Yuichi Toyama, Owariasahi (JP)

(73) Assignee: JTEKT CORPORATION, Osaka (JP)

( * ) Notice: Subject to any disclaimer, the term of this patent is extended or adjusted under 35 U.S.C. 154(b) by 146 days.

(21) Appl. No.: 16/549,507

(22) Filed: Aug. 23, 2019

(65) Prior Publication Data

US 2020/0072688 A1  Mar. 5, 2020

(30) Foreign Application Priority Data

Aug. 29, 2018 (JP) .............................. JP2018-160664

(51) Int. Cl.
*G01L 3/10* (2006.01)
*G01L 5/22* (2006.01)

(52) U.S. Cl.
CPC .............. *G01L 3/104* (2013.01); *G01L 5/221* (2013.01)

(58) Field of Classification Search
CPC ................................. G01L 5/221; G01L 3/104
USPC ..................................................... 73/862.193
See application file for complete search history.

(56) References Cited

U.S. PATENT DOCUMENTS

| | | | | |
|---|---|---|---|---|
| 8,393,230 B2* | 3/2013 | Jeon | ......................... | G01L 5/221 |
| | | | | 73/862.193 |
| 9,435,703 B2* | 9/2016 | Maehara | .................. | G01L 3/101 |
| 2003/0154800 A1 | 8/2003 | Laidlaw et al. | | |
| 2016/0153850 A1 | 6/2016 | Takahashi et al. | | |
| 2016/0214648 A1 | 7/2016 | Schoepe et al. | | |
| 2018/0143092 A1 | 5/2018 | Hotta et al. | | |
| 2020/0033209 A1* | 1/2020 | Toyama | ................... | G01L 3/104 |
| 2020/0049577 A1* | 2/2020 | Tsuruo | .................... | H05K 5/065 |

FOREIGN PATENT DOCUMENTS

JP    2018-084444 A    5/2018

OTHER PUBLICATIONS

Jan. 30, 2020 Extended European Search Report issued in European Patent Application No. 19194013.9.

* cited by examiner

*Primary Examiner* — Octavia Hollington
(74) *Attorney, Agent, or Firm* — Oliff PLC

(57) ABSTRACT

A sensor device that can suppress positional fluctuations of a sensor element with first and second magnetism collection portions due to injection molding of a housing is provided. A housing of a torque sensor has a ring portion cover portion that surrounds and holds a first ring portion of a first magnetism collection ring and a second ring portion of a second magnetism collection ring, and a sensor cover portion that houses a first magnetism collection portion, a second magnetism collection portion, and a sensor unit. The sensor cover portion extends toward the radially outer side from the ring portion cover portion. The sensor cover portion has a sensor housing portion that houses the sensor unit as interposed between the first magnetism collection portion and the second magnetism collection portion, an opening portion that opens in the axial direction, and a lid portion that closes the opening portion.

7 Claims, 6 Drawing Sheets

SENSOR DEVICE

INCORPORATION BY REFERENCE

The disclosure of Japanese Patent Application No. 2018-160664 filed on Aug. 29, 2018 including the specification, drawings and abstract, is incorporated herein by reference in its entirety.

BACKGROUND OF THE INVENTION

1. Field of the Invention

The present invention relates to a sensor device.

2. Description of the Related Art

There is known a torque sensor that detects torque applied to a steering shaft as described in Japanese Patent Application Publication No. 2018-84444 (JP 2018-84444 A). The steering shaft has an input shaft and an output shaft. The input shaft and the output shaft are connected to each other by a torsion bar.

The torque sensor has a permanent magnet fixed to the input shaft, a pair of magnetic yokes fixed to the output shaft and disposed in a magnetic field formed by the permanent magnet, a pair of magnetism collection rings that guide magnetism from the magnetic yokes, a holder that holds the magnetism collection rings, and a sensor element that generates a detection signal on the basis of the magnetism that is guided by the magnetism collection rings. The magnetism collection rings according to JP 2018-84444 A have a first magnetism collection ring and a second magnetism collection ring. The first magnetism collection ring and the second magnetism collection ring are disposed side by side in an axial direction of the output shaft. The first magnetism collection ring has a first ring portion that surrounds the magnetic yokes, and a first magnetism collection portion that extends toward the radially outer side from the first ring portion. The second magnetism collection ring has a second ring portion that surrounds the magnetic yokes, and a second magnetism collection portion that extends toward the radially outer side from the second ring portion. The sensor element is disposed between the first magnetism collection portion and the second magnetism collection portion. The sensor element detects magnetism that passes between the first magnetism collection portion and the second magnetism collection portion. The holder has a first holder formed by insert molding so as to surround the first magnetism collection ring, and a second holder formed by insert molding so as to surround the second magnetism collection ring. The first holder and the second holder are covered by a housing formed by injection molding.

In the device according to JP 2018-84444 A, the first holder and the second holder are occasionally deformed so as to be collapsed by a molding pressure applied to form the housing by injection molding. In the case where the first holder is deformed so as to be collapsed toward the second holder, a force due to the deformation of the first holder may act on the first magnetism collection portion of the first magnetism collection ring, which may vary the positional relationship of the first magnetism collection portion with respect to the sensor element. In the case where the second holder is deformed so as to be collapsed toward the first holder, a force due to the deformation of the second holder may act on the second magnetism collection portion, which may vary the positional relationship of the second magnetism collection portion with respect to the sensor element. Such fluctuations in positional relationship may affect the detection precision of the sensor element in detecting magnetism that passes between the first magnetism collection portion and the second magnetism collection portion.

SUMMARY OF THE INVENTION

It is an object of the present invention to provide a sensor device that can suppress fluctuations in the positional relationship of a sensor element with a first magnetism collection portion and with a second magnetism collection portion due to a molding pressure applied to form a housing by injection molding.

An aspect of the present invention provides a sensor device including: a permanent magnet attached to a first shaft and magnetized in a circumferential direction; a magnetic yoke that is fixed to a second shaft coupled to the first shaft and is disposed in a magnetic field formed by the permanent magnet; a first magnetism collection ring that has an annular first ring portion that surrounds the magnetic yoke and a first magnetism collection portion that includes a portion disposed on a radially outer side of the first ring portion; a second magnetism collection ring disposed side by side with the first magnetism collection ring in an axial direction of the second shaft, the second magnetism collection ring having an annular second ring portion that surrounds the magnetic yoke and a second magnetism collection portion that includes a portion disposed on a radially outer side of the second ring portion; a housing formed by insert molding so as to integrally surround the first ring portion and the second ring portion; and a sensor element that detects magnetism of a magnetic circuit formed by the permanent magnet, the magnetic yoke, the first magnetism collection ring, and the second magnetism collection ring. In the sensor device, the housing has a ring portion cover portion that integrally surrounds and holds the first ring portion and the second ring portion, and a sensor cover portion that surrounds and holds the first magnetism collection portion, the second magnetism collection portion, and the sensor element; and the sensor cover portion houses the sensor element as interposed between the first magnetism collection portion and the second magnetism collection portion, and has an opening portion for insertion of the sensor element into the sensor cover portion covered by a lid portion.

With the configuration described above, when the housing is formed by insert molding so as to integrally surround the first ring portion and the second ring portion, the sensor cover portion that is configured to house the sensor element as interposed between the first magnetism collection portion and the second magnetism collection portion is molded. After the sensor cover portion is molded, the sensor element is housed inside the sensor cover portion via the opening portion, and the opening portion is closed by the lid portion. Thus, the sensor element is not housed inside a die for forming the housing by insert molding when the housing is formed by insert molding. Thus, a molding pressure applied to mold the housing does not act to fluctuate the positional relationship of the sensor element with the first magnetism collection portion and with the second magnetism collection portion.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
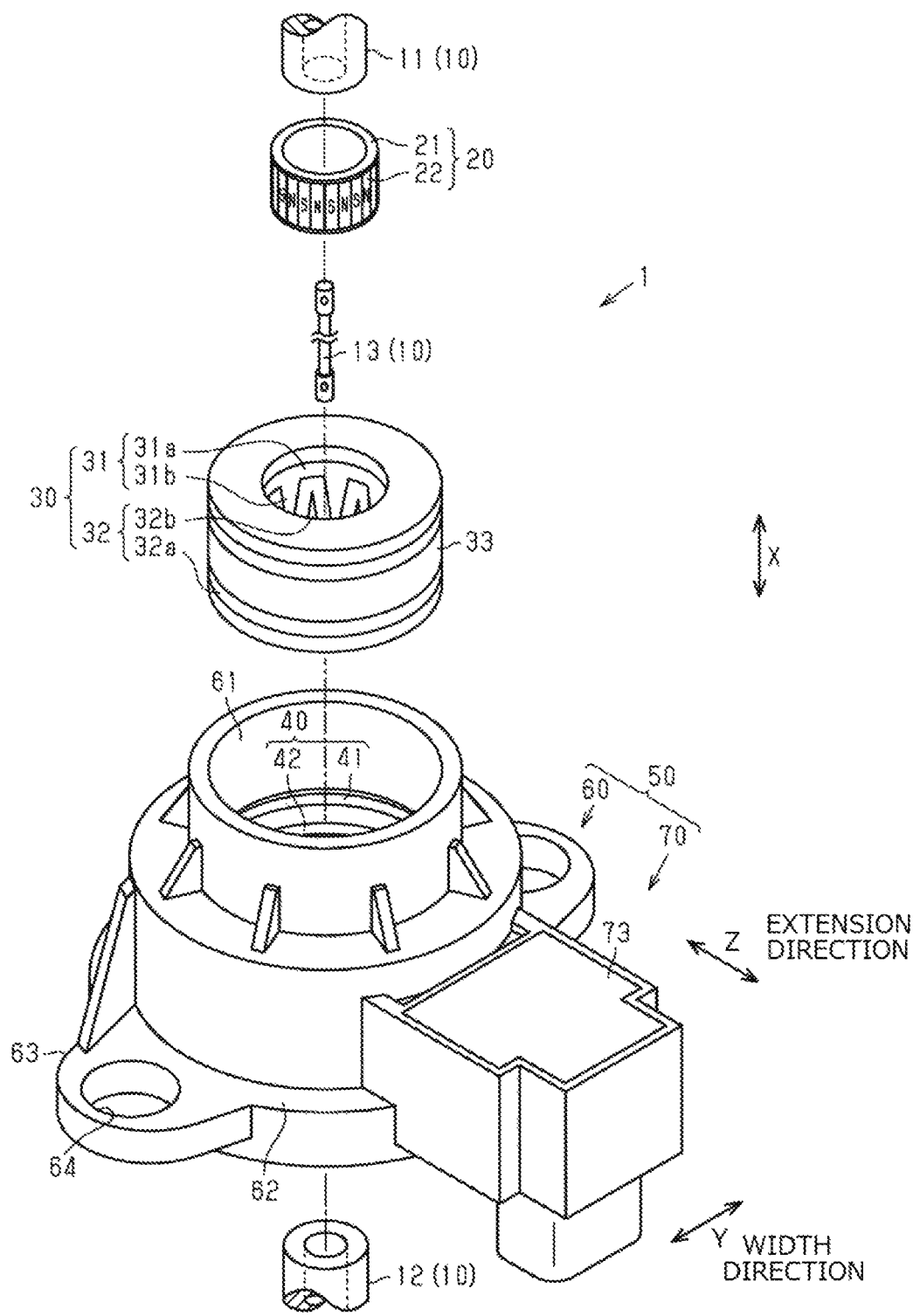
FIG. 1 is an exploded perspective view illustrating the configuration of a torque sensor according to a first embodiment.
Figure 2:
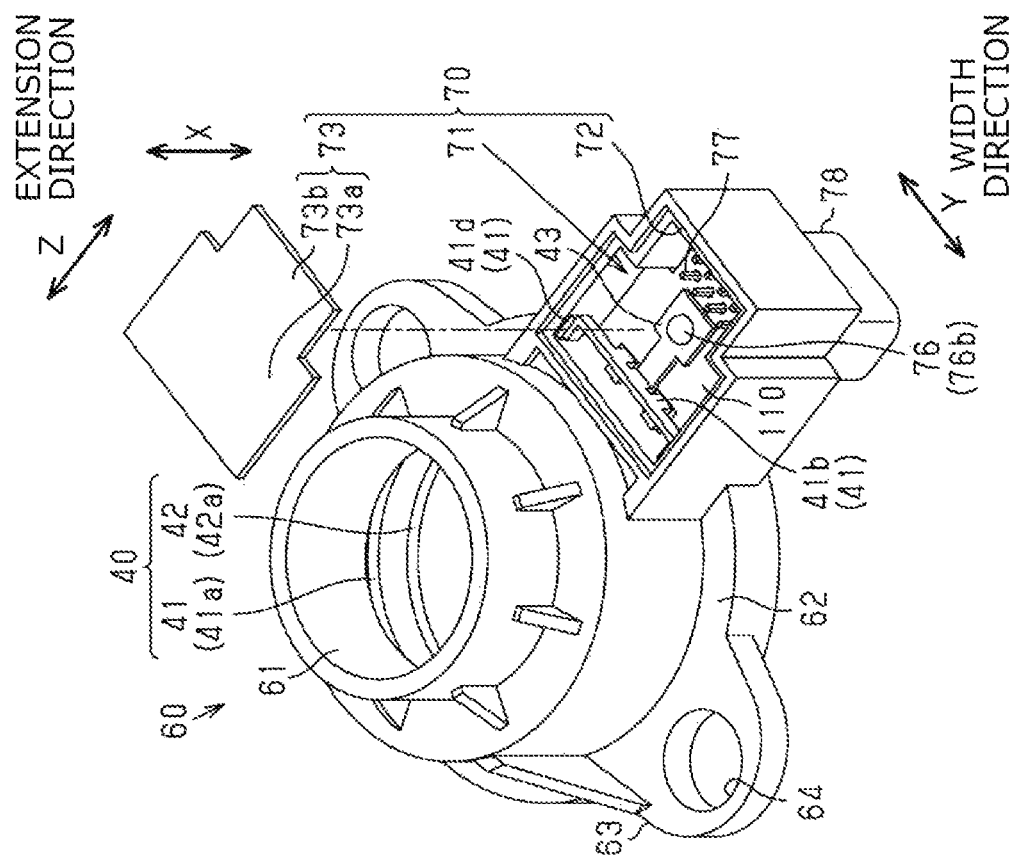
FIG. 2 is a perspective view of a housing in a state in which a lid portion of a sensor housing portion is removed in the torque sensor according to the first embodiment.
Figure 3:
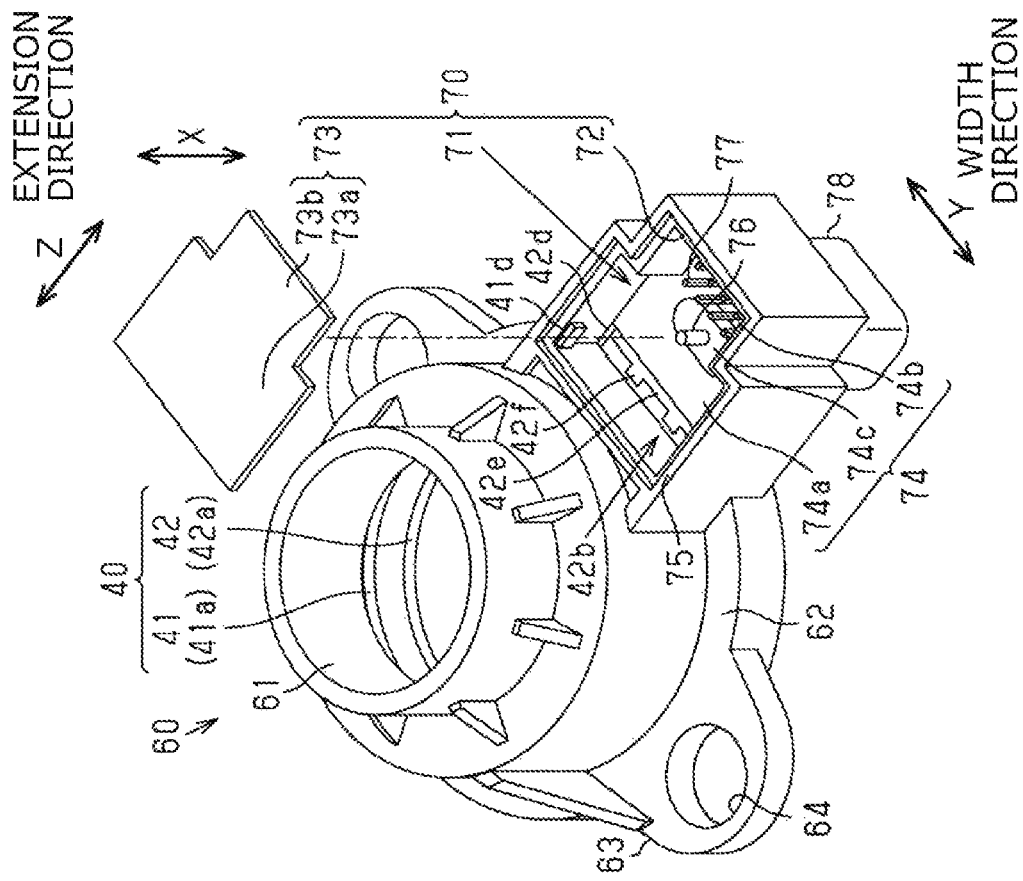
FIG. 3 is a perspective view of the housing in a state in which the lid portion of the sensor housing portion is removed and a sensor unit is removed in the torque sensor according to the first embodiment.

A torque sensor that serves as a sensor device according to a first embodiment of the present invention will be described below. As illustrated in FIGS. 1 to 3, a torque sensor 1 as the sensor device includes a torsion bar 13, a cylindrical permanent magnet 20, a cylindrical magnetic yoke 30, a cylindrical magnetism collection ring 40 disposed so as to surround the magnetic yoke 30, a housing 50 that holds the magnetism collection ring 40, and a sensor unit 110. The torque sensor 1 detects torque applied to a rotary shaft 10 such as a steering shaft of an electric power steering system, for example.

The rotary shaft 10 is composed of an input shaft 11, an output shaft 12, and the torsion bar 13. The torsion bar 13 that serves as a coupling shaft is disposed between the input shaft 11 servings as a first shaft and the output shaft 12 serving as a second shaft. The input shaft 11 and the output shaft 12 are coupled to each other on the same axis via the torsion bar 13.

The permanent magnet 20 is coupled to the input shaft 11. The permanent magnet 20 has a cylindrical holding portion 21 and a multipole magnet 22. The holding portion 21 is externally fitted with an end portion of the input shaft 11 on the output shaft 12 side. The holding portion 21 is attached so as to be rotatable together with the input shaft 11. The multipole magnet 22 is attached to the outer peripheral surface of the holding portion 21. The multipole magnet 22 is structured such that N and S magnetic poles are disposed alternately in the circumferential direction of the holding portion 21.

The magnetic yoke 30 is coupled to the output shaft 12. The magnetic yoke 30 has an annular first magnetic yoke 31 and an annular second magnetic yoke 32. The first magnetic yoke 31 and the second magnetic yoke 32 are disposed coaxially with the output shaft 12, and fixed so as to be rotatable together with the output shaft 12. The first magnetic yoke 31 and the second magnetic yoke 32 are disposed around the multipole magnet 22 via a predetermined clearance therefrom. The first magnetic yoke 31 and the second magnetic yoke 32 are disposed in a magnetic field formed by the multipole magnet 22. The first magnetic yoke 31 and the second magnetic yoke 32 are disposed so as to face each other with a predetermined clearance therebetween in an axial direction X. The axial direction X is the axial direction of the output shaft 12, and is parallel to the axis of the input shaft 11 and the output shaft 12. The first magnetic yoke 31 has a first annular portion 31a and a plurality of first lug portions 31b that extend toward the second magnetic yoke 32 from the inner peripheral surface of the first annular portion 31a. The first lug portions 31b are disposed at equal intervals in the circumferential direction on the inner peripheral surface of the first annular portion 31a. The second magnetic yoke 32 has a second annular portion 32a and a plurality of second lug portions 32b that extend toward the first magnetic yoke 31 from the inner peripheral surface of the second annular portion 32a. The second lug portions 32b are disposed at equal intervals in the circumferential direction on the inner peripheral surface of the second annular portion 32a. The first magnetic yoke 31 and the second magnetic yoke 32 are molded in a synthetic resin body 33 with the first lug portions 31b and the second lug portions 32b displaced from each other by a constant distance in the circumferential direction. The inner peripheral surfaces of the first magnetic yoke 31 and the second magnetic yoke 32 are exposed from the synthetic resin body 33 to a space in the inner peripheral region. The outer peripheral surfaces of the first annular portion 31a and the second annular portion 32a are exposed from the synthetic resin body 33 to a space in the outer peripheral region. The first magnetic yoke 31 and the second magnetic yoke 32 are constituted of a magnetic material.

In a neutral state in which the torsion bar 13 between the input shaft 11 and the output shaft 12 is not twisted, the distal ends of the first lug portions 31b of the first magnetic yoke 31 and the distal ends of the second lug portions 32b of the second magnetic yoke 32 point to the boundary between the N poles and the S poles of the multipole magnet 22 of the permanent magnet 20.

The magnetism collection ring 40 has an annular first magnetism collection ring 41 that guides and collects magnetism of the first magnetic yoke 31, and an annular second magnetism collection ring 42 that guides and collects magnetism of the second magnetic yoke 32. The first magnetism collection ring 41 and the second magnetism collection ring 42 are disposed side by side with a predetermined clearance therebetween in the axial direction X. The first magnetism collection ring 41 and the second magnetism collection ring 42 are constituted of a magnetic material.

The housing 50 has a ring portion cover portion 60 that surrounds and holds a first ring portion 41a of the first magnetism collection ring 41 and a second ring portion 42a of the second magnetism collection ring 42, and a sensor cover portion 70 that houses a first magnetism collection portion 41b of the first magnetism collection ring 41, a second magnetism collection portion 42b of the second magnetism collection ring 42, and the sensor unit 110. The first ring portion 41a and the second ring portion 42a are disposed side by side in the axial direction X. The ring portion cover portion 60 and the sensor cover portion 70 are formed integrally from the same resin material.

The sensor cover portion 70 extends toward the radially outer side from the ring portion cover portion 60. The sensor cover portion 70 has a generally rectangular shape when seen in the axial direction X. The sensor cover portion 70 has a sensor housing portion 71 that houses the sensor unit 110 as interposed between the first magnetism collection portion 41b and the second magnetism collection portion 42b, an opening portion 72 that opens in the axial direction X, and a lid portion 73 that closes the opening portion 72. The sensor cover portion 70 extends toward the radially outer side from the ring portion cover portion 60.

Figure 4:
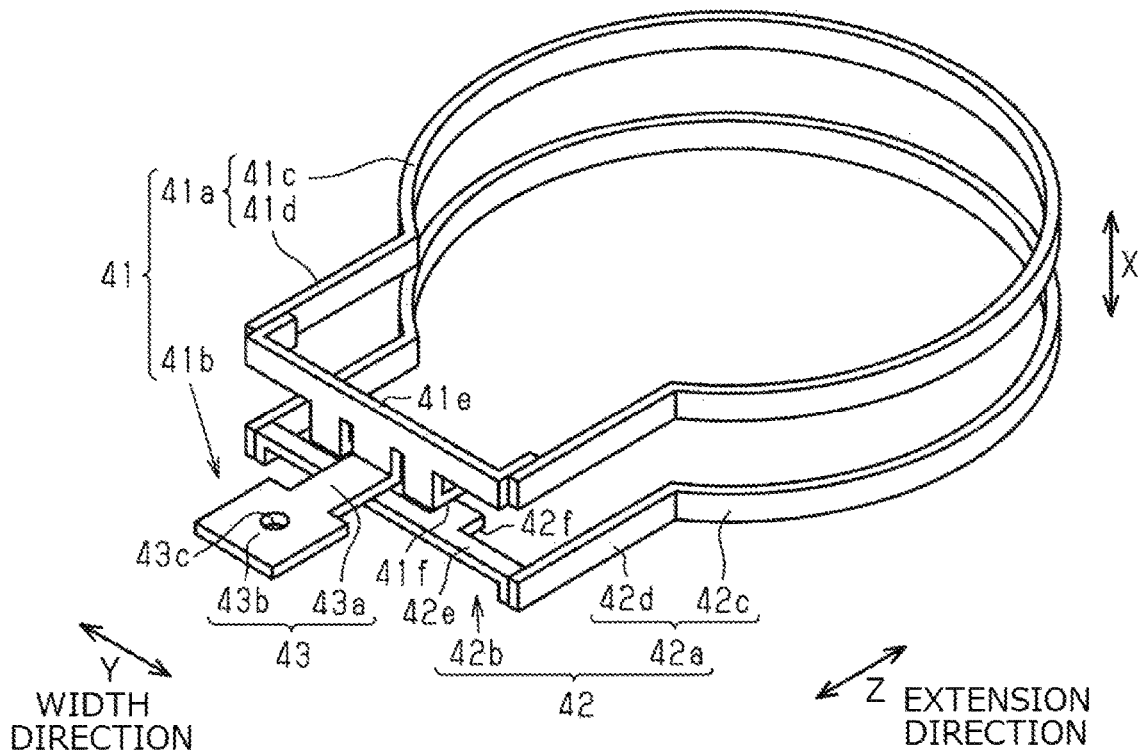
FIG. 4 illustrates a schematic configuration of a first magnetism collection ring and a second magnetism collection ring in the torque sensor according to the first embodiment.

As illustrated in FIGS. 1 and 4, the second magnetism collection ring 42 has the second ring portion 42a that is disposed at the outer periphery of the second magnetic yoke 32 with a clearance therefrom so as to surround the second magnetic yoke 32, and the second magnetism collection portion 42b that includes a portion disposed on the radially outer side of the second ring portion 42a. The second ring portion 42a has a second annular portion 42c that has a C-shape, and two second extension portions 42d that extend toward the radially outer side from respective end portions of the second annular portion 42c in the circumferential direction. The second ring portion 42a is formed integrally with the second extension portions 42d. The second magnetism collection portion 42b is formed separately from the second extension portions 42d. The second extension portions 42d are disposed in parallel with each other. When the second magnetism collection ring 42 is housed inside the housing 50, the second extension portions 42d extend in a direction (hereinafter referred to as an "extension direction Z") in which the sensor cover portion 70 extends. The second extension portions 42d face each other in a direction (hereinafter referred to as a "width direction Y") that is orthogonal to the direction in which the sensor cover portion 70 extends. The second magnetism collection portion 42b is disposed outside the second annular portion 42c. The second magnetism collection portion 42b is covered by the housing 50 with a part of the second magnetism collection portion 42b formed by insert molding, and disposed as interposed between the second extension portions 42d in the width direction Y. The second magnetism collection portion 42b has a second flat plate portion 42e and second sensor facing portions 42f that face a sensor element 111 of the sensor unit 110. The longitudinal portion of the second flat plate portion 42e has a rectangular shape to extend in the width direction Y when seen in the axial direction X. End portions of the second flat plate portion 42e in the width direction Y are formed to be bent to extend in a direction away from the first magnetism collection ring 41 in the axial direction X. Portions of the second flat plate portion 42e that extend in the axial direction X abut against the second extension portions 42d.

The second sensor facing portions 42f are formed to extend in a direction closer to the second annular portion 42c in the extension direction Z from a surface of the second flat plate portion 42e on the second annular portion 42c side. The second sensor facing portions 42f have a rectangular shape when seen in the axial direction X. In the present embodiment, a pair of the second sensor facing portions 42f are provided. The second magnetism collection ring 42 is constituted of a metal material.

Figure 5:
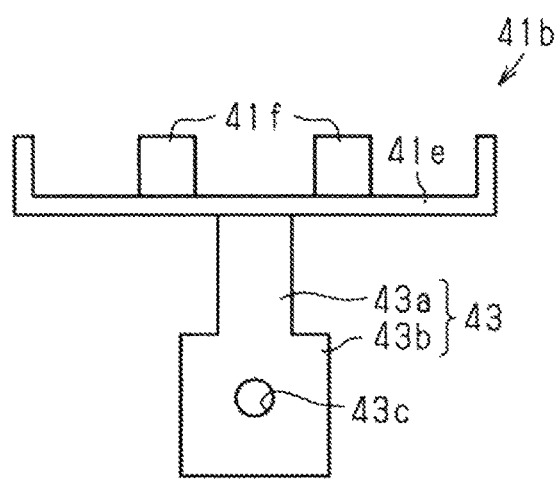
FIG. 5 is a top view of the first magnetism collection portion in the torque sensor according to the first embodiment.

As illustrated in FIGS. 4 and 5, the first magnetism collection ring 41 has the first ring portion 41a that is disposed at the outer periphery of the first magnetic yoke 31 with a clearance therefrom so as to surround the first magnetic yoke 31, and the first magnetism collection portion 41b that includes a portion disposed on the radially outer side of the first ring portion 41a. The first ring portion 41a has a first annular portion 41c that has a C-shape, and two first extension portions 41d that extend toward the radially outer side from respective end portions of the first annular portion 41c in the circumferential direction.

The first ring portion 41a is formed integrally with the first extension portions 41d. The first magnetism collection portion 41b is formed separately from the first extension portions 41d. The first extension portions 41d are disposed in parallel with each other. When the first magnetism collection ring 41 is housed inside the housing 50, the first extension portions 41d extend in the extension direction Z from the respective end portions of the first annular portion 41c in the circumferential direction. The first extension portions 41d face each other in the width direction Y. The first magnetism collection portion 41b is disposed outside the first annular portion 41c. The first magnetism collection portion 41b has a first flat plate portion 41e, first sensor facing portions 41f that face the sensor element 111 of the sensor unit 110, and a positioning portion 43. The longitudinal portion of the first flat plate portion 41e has a rectangular shape to extend in the width direction Y when seen in the extension direction Z. End portions of the first flat plate portion 41e in the width direction Y are formed to be bent to extend toward the first annular portion 41c in the extension direction Z. Portions of the first flat plate portion 41e that extend in the extension direction Z abut against the first extension portions 41d. The positioning portion 43 is disposed on the radially outer side of the first annular portion 41c with respect to the first extension portions 41d in the extension direction Z. The first sensor facing portions 41f extend from the first flat plate portion 41e toward the second magnetism collection portion 42b in the axial direction X, and are formed to be bent to extend toward the first annular portion 41c in the extension direction Z. The first sensor facing portions 41f have a rectangular shape when seen in the axial direction X. In the present embodiment, a pair of first sensor facing portions 41f are provided. The first sensor facing portions 41f and the second sensor facing portions 42f face each other in the axial direction X with the sensor unit 110 disposed therebetween. The positioning portion 43 is formed to extend away from the first annular portion 41c in the extension direction Z, and has a small plate portion 43a and a large plate portion 43b arranged in this order from the base end side toward the distal end side. The small plate portion 43a is formed to be smaller in the width direction Y than the large plate portion 43b. A second through hole 43c is provided in the center portion of the large plate portion 43b to penetrate in the axial direction X. The first sensor facing portions 41f are disposed on the second magnetism collection portion 42b side with respect to the positioning portion 43 in the axial direction X. The first magnetism collection ring 41 is constituted of a metal material.

Figure 6:
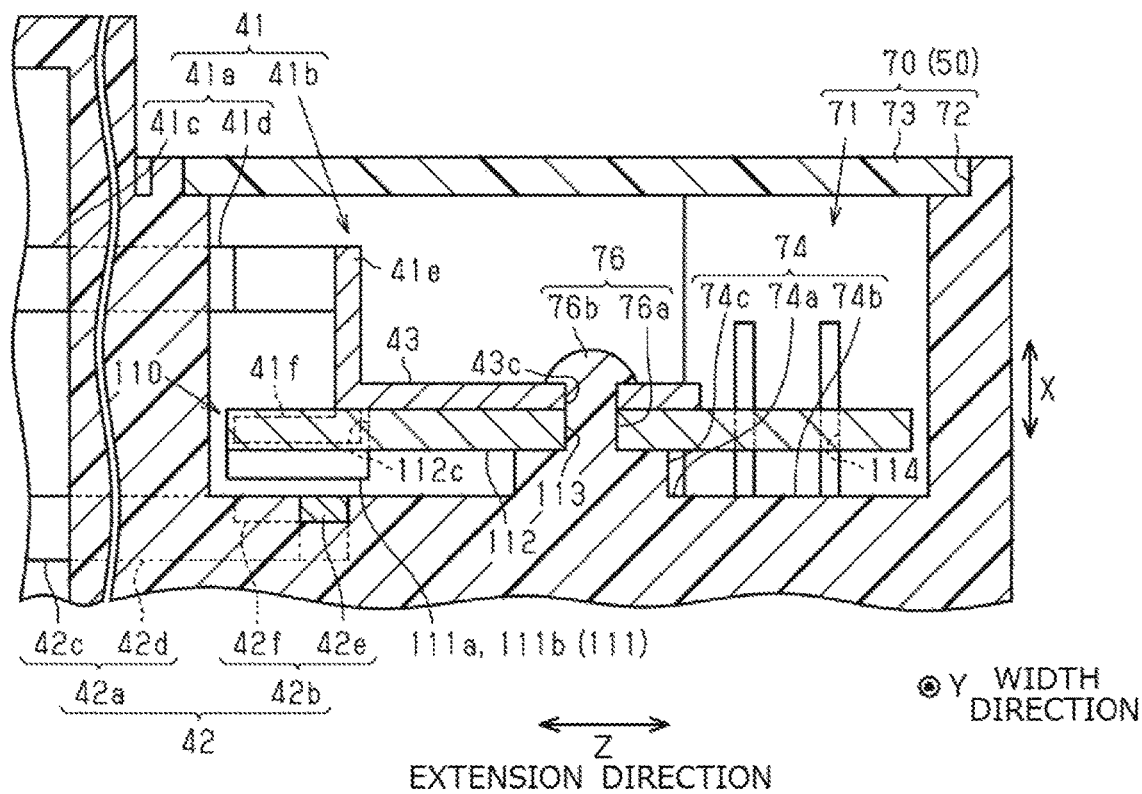
FIG. 6 is a schematic sectional view of the sensor housing portion in the torque sensor according to the first embodiment.

As illustrated in FIGS. 1 and 6, when the first ring portion 41a of the first magnetism collection ring 41 is disposed at the outer periphery of the first magnetic yoke 31 and the second ring portion 42a of the second magnetism collection ring 42 is disposed at the outer periphery of the second magnetic yoke 32, the first sensor facing portions 41f of the first magnetism collection portion 41b and the second sensor facing portions 42f of the second magnetism collection portion 42b are disposed so as to face each other with a predetermined clearance therebetween in the axial direction X.

As illustrated in FIGS. 1 to 3 and 6, the ring portion cover portion 60 has a generally cylindrical shape so as to surround both the first annular portion 41c of the first ring portion 41a and the second annular portion 42c of the second ring portion 42a. The ring portion cover portion 60 is formed with a through hole 61 that penetrates in the axial direction X. The first annular portion 41c of the first ring portion 41a and the second annular portion 42c of the second ring portion 42a are exposed to a space on the inner peripheral side of the through hole 61 of the ring portion cover portion 60. The rotary shaft 10, the permanent magnet 20, and the magnetic yoke 30 are disposed on the inner peripheral side of the through hole 61 of the ring portion cover portion 60. The magnetic yoke 30 coupled to the output shaft 12 is disposed on the outer peripheral side of the permanent magnet 20 coupled to the input shaft 11. When the rotary shaft 10 is inserted through the through hole 61 of the ring portion cover portion 60, the first annular portion 41c of the first ring portion 41a faces the first magnetic yoke 31 and the second annular portion 42c of the second ring portion 42a faces the second magnetic yoke 32 in the radial direction of the output shaft 12. The ring portion cover portion 60 has a flange portion 62 that overhangs outward from the outer peripheral surface thereof over the entire circumference. The overhanging length of the flange portion 62 is constant over the entire circumference. The ring portion cover portion 60 has a pair of attachment portions 63 that overhang outward from the outer peripheral surface of the flange portion 62. The attachment portions 63 are provided on respective sides of the flange portion 62 in the width direction Y. The attachment portions 63 are provided with attachment holes 64 that penetrate in the axial direction X. The attachment holes 64 are used for attachment to an object for attachment such as a housing of an electric power steering system. Fixing materials such as screws (not illustrated) are inserted through the attachment holes 64 to attach the ring portion cover portion 60 to the object for attachment.

The sensor housing portion 71 of the sensor cover portion 70 has a bottom wall 74 on which the sensor unit 110 is placed, and a side wall 75 that separates a space inside the sensor housing portion 71 and the outside from each other. A part of the first extension portions 41d and a part of the second extension portions 42d are exposed to the side wall 75. The bottom wall 74 has a first bottom wall portion 74a and a second bottom wall portion 74b arranged in this order from the base end side toward the distal end side in the extension direction Z. The second bottom wall portion 74b is formed to be smaller in the width direction Y and smaller in the extension direction Z than the first bottom wall portion 74a. The first bottom wall portion 74a is formed integrally with a placement portion 74c that projects in the axial direction X from the first bottom wall portion 74a toward the opening portion 72. The placement portion 74c has an elliptical column shape. The placement portion 74c has an elliptical cross-sectional shape in a direction that is orthogonal to the axial direction X. The placement portion 74c is formed integrally with a projection portion 76 that projects in the axial direction X from the top surface of the placement portion 74c toward the opening portion 72. The projection portion 76 has a circular column shape. A plurality of signal terminals 77 that extend in the axial direction X are exposed to the second bottom wall portion 74b. A connector portion 78 for connection with an external device is provided on a surface of the sensor housing portion 71 on the opposite side from the opening portion 72. The signal terminals 77 are electrically connected to the connector portion 78. The top surface of the placement portion 74c functions as a bottom wall portion of the sensor housing portion 71 on which a circuit board 112 to be discussed later is to be disposed.

The lid portion 73 has a first lid portion 73a and a second lid portion 73b arranged in this order from the base end side toward the distal end side in the extension direction Z. The second lid portion 73b is formed to be smaller in the width direction Y and smaller in the extension direction Z than the first lid portion 73a. The lid portion 73 is fitted with the opening portion 72 to close the opening portion 72.

Figure 7:
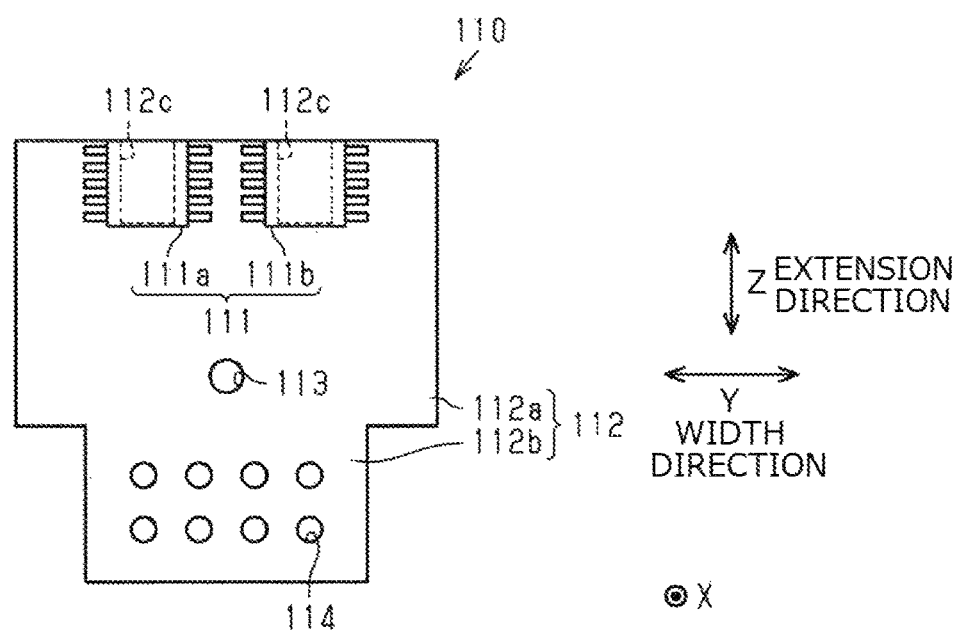
FIG. 7 is a top view of the sensor unit in the torque sensor according to the first embodiment.

The sensor unit 110 will be described. As illustrated in FIGS. 2 and 7, the sensor unit 110 has the sensor element 111 and the circuit board 112 to which the sensor element 111 is connected. When the sensor unit 110 is housed in the sensor housing portion 71, the circuit board 112 has a first circuit board portion 112a and a second circuit board portion 112b arranged in this order from the base end side toward the distal end side in the extension direction Z. The second circuit board portion 112b is formed to be smaller in the width direction Y and smaller in the extension direction Z than the first circuit board portion 112a. When the sensor unit 110 is housed in the sensor housing portion 71, a pair of notches 112c are provided at an end portion of the first circuit board portion 112a on the base end side in the extension direction Z. The notches 112c have a rectangular shape when the circuit board 112 is seen in the axial direction X. The sensor element 111 has a rectangular parallelepiped shape, for example. A magnetism detection element such as a Hall element, for example, is adopted as the sensor element 111. In the present embodiment, the sensor element 111 includes two sensor elements, namely a first sensor element 111a and a second sensor element 111b, provided redundantly. The first sensor element 111a and the second sensor element 111b are disposed side by side in the width direction Y. The first sensor element 111a and the second sensor element 111b are formed to be larger than the notches 112c when seen in the axial direction X. The first sensor element 111a and the second sensor element 111b are mounted at positions overlapping the notches 112c when seen in the axial direction X. When the first sensor element 111a and the second sensor element 111b are mounted on the circuit board 112, the first sensor element 111a and the second sensor element 111b are mounted on a surface of the circuit board 112 on the second magnetism collection portion 42b side. The second circuit board portion 112b is formed with a plurality of terminal holes 114 that penetrate in the axial direction X. No electronic components are mounted on a portion of the first circuit board portion 112a on the distal end side in the extension direction Z, that is, a portion of the circuit board 112 between the notches 112c and the terminal holes 114, and this portion is formed with a first through hole 113. The first through hole 113 penetrates in the axial direction X. The inside diameter of the first through hole 113 is set to be equal to the inside diameter of the second through hole 43c of the positioning portion 43.

As illustrated in FIGS. 3 and 6, portions of the first extension portions 41d on the first annular portion 41c side in the extension direction Z are embedded in the side wall 75, and portions thereof on the opposite side from the first annular portion 41c in the extension direction Z are exposed in the sensor housing portion 71. The second extension portions 42d are covered by the first bottom wall portion 74a except for surfaces of the second extension portions 42d on the opening portion 72 side, and the surfaces of the second extension portions 42d on the opening portion 72 side are exposed in the sensor housing portion 71. The second magnetism collection portion 42b is covered by the first bottom wall portion 74a except for a surface of the second magnetism collection portion 42b on the opening portion 72 side, and the surface of the second magnetism collection portion 42b on the opening portion 72 side is exposed in the sensor housing portion 71.

As illustrated in FIGS. 2, 3, and 6, when the circuit board 112 on which the sensor element 111 is mounted is assembled to the sensor housing portion 71, the projection portion 76 has a shaft portion 76a that extends in the axial direction X, and a head portion 76b provided at the distal end portion of the shaft portion 76a. The shaft portion 76a has a circular column shape. The shaft portion 76a is inserted through the first through hole 113 of the circuit board 112 and the second through hole 43c of the positioning portion 43 of the first magnetism collection portion 41b. The head portion 76b has a hemispherical shape. The outer peripheral surface of the head portion 76b is increased in diameter compared to the shaft portion 76a. The head portion 76b has a circular shape when seen in the axial direction X. The outside diameter of the head portion 76b is set to be larger than the inside diameter of the first through hole 113 and the inside diameter of the second through hole 43c. The bottom surface of the head portion 76b abuts against a surface of the positioning portion 43 of the first magnetism collection portion 41b on the opening portion 72 side.

The head portion 76b of the projection portion 76 is not formed before the circuit board 112 on which the sensor element 111 is mounted is assembled to the sensor housing portion 71, that is, when the projection portion 76 is only inserted through the first through hole 113 of the circuit board 112 and the second through hole 43c of the positioning portion 43. The head portion 76b is formed by applying heat staking to the distal end portion of the projection portion 76 after the projection portion 76 is inserted through the first through hole 113 of the circuit board 112 and the second through hole 43c of the positioning portion 43. Consequently, the circuit board 112 and the first magnetism collection portion 41b are assembled to the sensor housing portion 71.

An injection molding method for the housing 50 and a method of assembling the sensor unit 110 and the first magnetism collection portion 41b to the housing 50 will be described. A die clamping process is performed by disposing the first ring portion 41a of the first magnetism collection ring 41, the second ring portion 42a and the second magnetism collection portion 42b of the second magnetism collection ring 42, and the signal terminals 77 in a die (not illustrated) to be clamped in the die. After the die clamping process is performed, an injection process is performed by injecting a molten resin melted by heating from an injection device (not illustrated) into the die to fill the die with the molten resin. After the injection process is performed, a pressure holding process is performed by keeping a primary molding pressure, which is the pressure of the molten resin injected into the die, constant. By performing the pressure holding process, air bubbles etc. that remain in the molten resin are removed to suppress occurrence of a void, and the molten resin is spread throughout in the die. When the molten resin injected into the die is cooled, the molten resin is solidified so as to cover the first ring portion 41a, the second ring portion 42a, the second magnetism collection portion 42b, and the signal terminals 77. In this case, the molten resin is solidified with the molten resin covering portions of the first extension portions 41d on the first annular portion 41c side in the extension direction Z, outer surfaces of the second extension portions 42d excluding surfaces thereof on the opening portion 72 side, and outer surfaces of the second magnetism collection portion 42b excluding a surface thereof on the opening portion 72 side. Consequently, the housing 50 is formed by injection molding.

After the sensor cover portion 70 of the housing 50 is molded, the circuit board 112 on which the sensor element 111 is mounted is housed in the sensor housing portion 71 via the opening portion 72, and the projection portion 76 provided in the sensor housing portion 71 is inserted through the first through hole 113 of the circuit board 112 and the second through hole 43c of the positioning portion 43 of the first magnetism collection portion 41b. Consequently, a surface of the circuit board 112 on which the sensor element 111 is mounted abuts against the entire top surface of the placement portion 74c. The entire surface of the positioning portion 43 of the first magnetism collection portion 41b on the second magnetism collection portion 42b side abuts against a surface of the circuit board 112 on which the sensor element 111 is not mounted. When the projection portion 76 is inserted through the first through hole 113 of the circuit board 112, the signal terminals 77 are inserted through the terminal holes 114 of the circuit board 112, and the second sensor facing portions 42f face the sensor element 111 mounted on the circuit board 112. When the projection portion 76 is inserted through the first through hole 113 of the circuit board 112 and the second through hole 43c of the positioning portion 43, the first sensor facing portions 41f face the notches 112c of the circuit board 112 in the width direction Y and the extension direction Z, and the first sensor facing portions 41f face the sensor element 111 mounted on the circuit board 112 in the axial direction X. The head portion 76b is formed on the projection portion 76 by applying heat staking to the distal end portion of the projection portion 76 in this state. Consequently, the circuit board 112 and the first magnetism collection portion 41b are not movable in the axial direction X with respect to the sensor housing portion 71, which regulates the circuit board 112 and the first magnetism collection portion 41b slipping off from the projection portion 76. The opening portion 72 is closed by fitting the lid portion 73 with the opening portion 72 after the circuit board 112 and the first magnetism collection portion 41b are assembled to the sensor housing portion 71 in this manner. Consequently, assembly of the torque sensor 1 is completed.

In the thus configured torque sensor 1, when the rotary shaft 10 is rotationally operated, for example, to cause relative rotational displacement between the input shaft 11 and the output shaft 12, the positional relationship of the permanent magnet 20 with the first magnetic yoke 31 and with the second magnetic yoke 32 is varied, and therefore magnetism collected by the first magnetic yoke 31 and the second magnetic yoke 32 is varied. Consequently, magnetism that passes between the first magnetism collection portion 41b and the second magnetism collection portion 42b is varied, and therefore the intensity of magnetism applied to the sensor element 111 is varied. The intensity of magnetism applied to the sensor element 111 is varied in accordance with the torsional angle of the torsion bar 13. Thus, the torsional angle of the torsion bar 13 can be computed on the basis of a detection signal output from the sensor element 111, and therefore torque applied to the rotary shaft 10 can be computed on the basis of the torsional angle of the torsion bar 13.

The functions and the effects of the first embodiment will be described.

(1) When the housing 50 is formed by insert molding so as to integrally surround the first ring portion 41a and the second ring portion 42a, the sensor cover portion 70 configured to house the sensor element 111 as interposed between the first sensor facing portions 41f of the first magnetism collection portion 41b and the second sensor facing portions 42f of the second magnetism collection portion 42b is molded. After the sensor cover portion 70 is molded, the sensor element 111 is housed in the sensor housing portion 71 via the opening portion 72, and the opening portion 72 is closed by the lid portion 73. Thus, when the housing 50 is formed by insert molding, a molding pressure applied to form the housing 50 by insert molding does not act to fluctuate the positional relationship between the first sensor facing portions 41f of the first magnetism collection portion 41b and the sensor element 111 and the positional relationship between the second sensor facing portions 42f of the second magnetism collection portion 42b and the sensor element 111.

(2) After the sensor cover portion 70 is molded, the circuit board 112 on which the sensor element 111 is mounted is housed in the sensor housing portion 71 via the opening portion 72, and the projection portion 76 is inserted through the first through hole 113 of the circuit board 112. Consequently, a surface of the circuit board 112 on which the sensor element 111 is mounted abuts against the top surface of the placement portion 74c, and a surface of the circuit board 112 on which the sensor element 111 is not mounted abuts against a surface of the positioning portion 43 of the first magnetism collection portion 41b on the second magnetism collection portion 42b side. The circuit board 112 is assembled to the sensor housing portion 71 in this manner. The projection portion 76 is provided on the bottom wall 74 of the sensor housing portion 71. Therefore, the position of assembly of the sensor element 111 to the sensor housing portion 71 can be determined by inserting the projection portion 76 through the first through hole 113 of the circuit board 112.

(3) The first magnetism collection portion 41b is formed separately from the first ring portion 41a. Thus, the circuit board 112 can be assembled with the first magnetism collection portion 41b removed when the circuit board 112 on which the sensor element 111 is mounted is housed in the sensor housing portion 71 via the opening portion 72. After the circuit board 112 is assembled to the sensor housing portion 71, the first magnetism collection portion 41b can be assembled such that end portions of the first flat plate portion 41e of the first magnetism collection portion 41b in the width direction Y face the first extension portions 41d. Thus, the circuit board 112 and the first magnetism collection portion 41b can be easily installed in the sensor housing portion 71. Both the position of assembly of the first magnetism collection portion 41b to the first ring portion 41a and the position of assembly of the first magnetism collection portion 41b to the sensor element 111 can be determined by inserting the projection portion 76 through the second through hole 43c provided in the positioning portion 43 of the first magnetism collection portion 41b.

(4) In a comparative example, in the case where a housing is formed by injection molding with the sensor unit 110 interposed between a first holder and a second holder, a space in which the sensor unit 110 is to be disposed is formed between the first holder and the second holder. Thus, a first magnetism collection portion and a second magnetism collection portion are occasionally deformed with the first holder and the second holder deformed so as to be collapsed by a molding pressure applied during the injection molding of the housing. In the first embodiment, the first extension portion 41d and the second extension portion 42d are formed by insert molding while abutting against a die for molding the housing 50. Thus, the first extension portion 41d and the second extension portion 42d are not easily deformable. From the above, it is possible to suppress fluctuations in the position of assembly of the first magnetism collection portion 41b, which is disposed between the first extension portions 41d, to the sensor element 111 and the position of assembly of the second magnetism collection portion 42b, which is disposed between the second extension portions 42d, to the sensor element 111.

A torque sensor according to a second embodiment will be described. Differences from the first embodiment will be mainly described.

Figure 8:
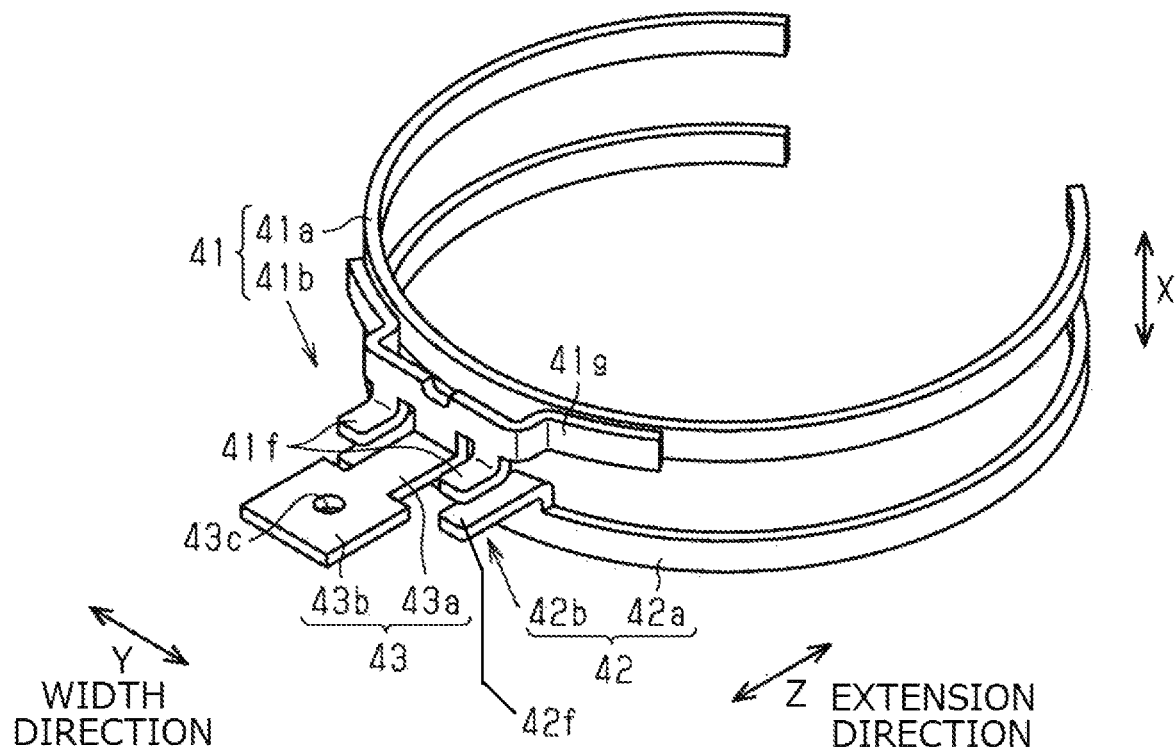
FIG. 8 illustrates a schematic configuration of a first magnetism collection ring and a second magnetism collection ring in the torque sensor according to a second embodiment.

As illustrated in FIG. 8, the second magnetism collection ring 42 has a second ring portion 42a disposed at the outer periphery of the second magnetic yoke 32 with a clearance therefrom so as to surround the second magnetic yoke 32, and second magnetism collection portions 42b that extend toward the radially outer side from the second ring portion 42a. The second ring portion 42a has a C-shape. The second magnetism collection portions 42b are formed integrally with the second ring portion 42a. The second magnetism collection portions 42b are formed at the middle portion of the second ring portion 42a in the circumferential direction. The second magnetism collection portions 42b extend toward the first ring portion 41a from a surface of the second ring portion 42a on the first ring portion 41a side, and are formed to be bent to extend in the extension direction Z. Portions of the second magnetism collection portions 42b that extend in the extension direction Z have a generally rectangular shape when seen in the axial direction X. The portions of the second magnetism collection portions 42b that extend in the extension direction Z are second sensor facing portions 42f that face the sensor element 111 in the axial direction X. In the present embodiment, a pair of the second sensor facing portions 42f are provided. The second magnetism collection ring 42 is constituted of a metal material.

Figure 9:
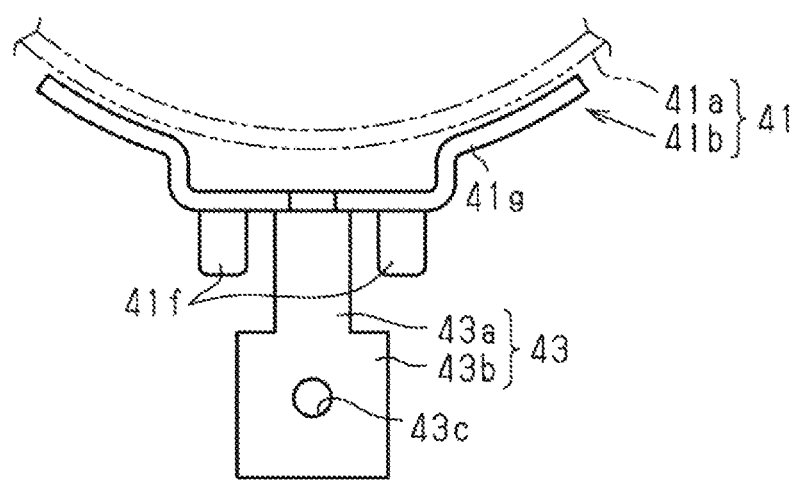
FIG. 9 is a top view of the second magnetism collection portion in the torque sensor according to the second embodiment.

As illustrated in FIGS. 8 and 9, the first magnetism collection ring 41 has a first ring portion 41a that is disposed at the outer periphery of the first magnetic yoke 31 with a clearance therefrom so as to surround the first magnetic yoke 31, and a first magnetism collection portion 41b that extends toward the radially outer side from the first ring portion 41a. The first ring portion 41a has a C-shape. The first magnetism collection portion 41b is formed separately from the first ring portion 41a, and disposed on the radially outer side of the first ring portion 41a with a predetermined clearance from the first ring portion 41a. The first magnetism collection portion 41b is disposed on the radially outer side at the middle portion of the first ring portion 41a in the circumferential direction. The first magnetism collection portion 41b has a ring portion facing portion 41g, first sensor facing portions 41f, and the positioning portion 43. The ring portion facing portion 41g has a generally arcuate plate shape along the first ring portion 41a. The middle portion of the ring portion facing portion 41g in the circumferential direction is formed to be bent away from the first ring portion 41a compared to both end portions of the ring portion facing portion 41g in the circumferential direction. The first sensor facing portions 41f extend in the axial direction X from the middle portion of the ring portion facing portion 41g in the circumferential direction toward the second ring portion 42a, and are formed to be bent to extend in the extension direction Z in the direction away from the first ring portion 41a. The first sensor facing portions 41f have a generally rectangular shape when seen in the axial direction X. In the present embodiment, a pair of the first sensor facing portions 41*f* are provided. The first sensor facing portions 41*f* and the second sensor facing portions 42*f* face each other in the axial direction X with the sensor element 111 disposed therebetween. The direction in which the first sensor facing portions 41*f* and the second sensor facing portions 42*f* face each other coincides with the axial direction X. The positioning portion 43 is provided between the two first sensor facing portions 41*f* in the width direction Y. The positioning portion 43 has the small plate portion 43*a* and the large plate portion 43*b* arranged in this order from the base end side toward the distal end side in the extension direction Z. The small plate portion 43*a* is formed to be smaller in the width direction Y than the large plate portion 43*b*. A second through hole 43*c* is provided in the center portion of the large plate portion 43*b* to penetrate in the axial direction X. The first magnetism collection ring 41 is constituted of a metal material.

After the sensor cover portion 70 of the housing 50 is molded, the circuit board 112 on which the sensor element 111 is mounted is housed in the sensor housing portion 71 via the opening portion 72, and the projection portion 76 provided in the sensor housing portion 71 is inserted through the first through hole 113 of the circuit board 112 and the second through hole 43*c* of the positioning portion 43 of the first magnetism collection portion 41*b*. A surface of the circuit board 112 on which the sensor element 111 is not mounted abuts against the entire top surface of the placement portion 74*c*. The entire surface of the positioning portion 43 of the first magnetism collection portion 41*b* on the second magnetism collection portion 42*b* side abuts against a surface of the circuit board 112 on which the sensor element 111 is mounted. When the projection portion 76 is inserted through the first through hole 113 of the circuit board 112 and the second through hole 43*c* of the positioning portion 43, the signal terminals 77 are inserted through the terminal holes 114 of the circuit board 112, and the second sensor facing portions 42*f* of the second magnetism collection portion 42*b* are inserted into the notches 112*c* of the circuit board 112. Thus, the second sensor facing portions 42*f* face the sensor element 111 that is mounted on the circuit board 112. When the projection portion 76 is inserted through the first through hole 113 of the circuit board 112 and the second through hole 43*c* of the positioning portion 43, the first sensor facing portions 41*f* face the sensor element 111 that is mounted on the circuit board 112. The opening portion 72 is closed by fitting the lid portion 73 with the opening portion 72 after the circuit board 112 and the first magnetism collection portion 41*b* are assembled to the sensor housing portion 71 in this manner. Consequently, assembly of the torque sensor 1 is completed.

The functions and the effects of the second embodiment will be described.

(5) The first magnetism collection portion 41*b* is formed separately and away from the first ring portion 41*a* in the radial direction. Thus, the circuit board 112 can be assembled to the sensor housing portion 71 with the first magnetism collection portion 41*b* removed when the circuit board 112 on which the sensor element 111 is mounted is housed in the sensor housing portion 71 via the opening portion 72. After the circuit board 112 is assembled to the sensor housing portion 71, the positioning portion 43 of the first magnetism collection portion 41*b* can be assembled to the sensor housing portion 71 such that the ring portion facing portion 41*g* of the first magnetism collection portion 41*b* and the first ring portion 41*a* face each other with a predetermined clearance therebetween. Thus, the circuit board 112 and the first magnetism collection portion 41*b* can be easily installed in the sensor housing portion 71. Both the position of assembly of the first magnetism collection portion 41*b* to the first ring portion 41*a* and the position of assembly of the first magnetism collection portion 41*b* to the sensor element 111 can be determined by inserting the projection portion 76 through the second through hole 43*c* that is provided in the positioning portion 43 of the first magnetism collection portion 41*b*.

The embodiments may be modified as follows. The following other embodiments may be combined with each other as long as the embodiments do not technically contradict with each other. In the first embodiment, the second ring portion 42*a* and the second magnetism collection portion 42*b* may be formed integrally with each other.

In the first embodiment, the first ring portion 41*a* and the first magnetism collection portion 41*b* may be formed integrally with each other if the sensor element 111 can be disposed between the first magnetism collection portion 41*b* and the second magnetism collection portion 42*b*. In this case, the circuit board 112 on which the sensor element 111 is mounted is disposed by being inserted into a space between the first magnetism collection portion 41*b* and the second magnetism collection portion 42*b* in the extension direction Z, for example.

In the second embodiment, the second ring portion 42*a* and the second magnetism collection portion 42*b* may be formed separately from each other. In the second embodiment, the first ring portion 41*a* and the first magnetism collection portion 41*b* may be formed integrally with each other if the sensor element 111 can be disposed between the first magnetism collection portion 41*b* and the second magnetism collection portion 42*b*.

In the first embodiment, the first extension portions 41*d* may not be provided. In this case, the first magnetism collection portion 41*b* is disposed between end portions of the first annular portion 41*c* in the circumferential direction. The second sensor facing portions 42*f* may extend from a surface of the second flat plate portion 42*e* on the first magnetism collection portion 41*b* side toward the first magnetism collection portion 41*b*, and be formed to be bent to extend toward the second annular portion 42*c* in the extension direction Z. In this case, the second sensor facing portions 42*f* face the notches 112*c* of the circuit board 112 in the width direction Y and the extension direction Z by inserting the projection portion 76 through the first through hole 113 of the circuit board 112 and the second through hole 43*c* of the positioning portion 43.

During injection molding of the housing 50, an injection process may be performed without disposing the second magnetism collection portion 42*b* in the die. In this case, a recess for placement of the second magnetism collection portion 42*b* may be formed in the first bottom wall portion 74*a* of the housing 50 that is formed by the injection molding, and the second magnetism collection portion 42*b* may be placed in the recess. The second magnetism collection portion 42*b* and the second extension portions 42*d* may be connected to each other in the width direction Y by welding or the like. The second magnetism collection portion 42*b* may be placed in a recess formed in the first bottom wall portion 74*a* for placement of the second magnetism collection portion 42*b*, and the second flat plate portion 42*e* and the second extension portions 42*d* of the second magnetism collection portion 42*b* may be connected to each other in the width direction Y by welding or the like.

The first magnetism collection portion 41*b* is assembled to the sensor housing portion 71 by inserting the projection portion 76 through the second through hole 43*c* of the positioning portion 43. However, the present invention is not limited thereto. For example, the first magnetism collection portion 41*b* may be assembled to the sensor housing portion 71 by connecting the first flat plate portion 41*e* of the first magnetism collection portion 41*b* and the second extension portions 42*d* in the width direction Y by welding or the like.

In the first embodiment, the second magnetism collection portion 42*b* in the plate thickness direction is entirely covered by the first bottom wall portion 74*a* so that only a surface of the second magnetism collection portion 42*b* on the opening portion 72 side is exposed in the sensor housing portion 71. However, the present invention is not limited thereto. For example, a part of the second magnetism collection portion 42*b* in the plate thickness direction may be covered by the first bottom wall portion 74*a* so that not only a surface of the second magnetism collection portion 42*b* on the opening portion 72 side but also a part of a surface of the second magnetism collection portion 42*b* in the extension direction Z is exposed in the sensor housing portion 71.

The first magnetism collection portion 41*b* is assembled to the sensor housing portion 71 by applying heat staking to the projection portion 76 that is inserted through the second through hole 43*c* of the positioning portion 43. However, the present invention is not limited thereto. For example, the first magnetism collection portion 41*b* may be assembled to the sensor housing portion 71 using a screw. Alternatively, the first magnetism collection portion 41*b* may be assembled to the sensor housing portion 71 with a snap-fit lug extending from the sensor housing portion 71 engaged with a snap-fit hole provided in the first magnetism collection portion 41*b*. In this case, the first magnetism collection portion 41*b* may not be provided with the positioning portion 43. That is, the method of fixing the first magnetism collection portion 41*b* to the sensor housing portion 71 is changeable as appropriate.

While the projection portion 76 is formed with the head portion 76*b*, the head portion 76*b* may not be provided. That is, it is only necessary that the projection portion 76 should include at least the shaft portion 76*a*. For example, the projection portion 76 may be positioned by sliding contact between the first through hole 113 and the second through hole 43*c*. In this case, a process of forming the head portion 76*b* by applying heat staking to the distal end portion of the projection portion 76 may be omitted.

While the shaft portion 76*a* has a circular column shape, the shaft portion 76*a* may have a polygonal column shape. Two or more of the projection portions 76 may be provided. The circuit board 112 is disposed on the top surface of the placement portion 74*c*. However, the present invention is not limited thereto. For example, the circuit board 112 may be disposed on the first bottom wall portion 74*a* of the sensor housing portion 71. In this case, the projection portion 76 is provided on the first bottom wall portion 74*a*.

The first magnetism collection ring 41 is provided with two the first sensor facing portions 41*f*, and the second magnetism collection ring 42 is provided with two the second sensor facing portions 42*f*. However, only one such facing portion may be provided, and three or more such facing portions may be provided.

The sensor unit 110 may be connected to a terminal (connection terminal) that has a conductive portion that can energize the sensor element 111. While a Hall element is adopted as the sensor element 111, a magnetoresistance element may be adopted.

While the sensor device is embodied as the torque sensor 1 that detects torque, the sensor device may be embodied as a rotational angle detection device that detects the rotational angle of the rotary shaft 10, for example.

What is claimed is:

1. A sensor device comprising:
    a permanent magnet attached to a first shaft and magnetized such that N poles and S poles appear alternately in a circumferential direction on an outer peripheral surface of the permanent magnet;
    a magnetic yoke that is fixed to a second shaft coupled to the first shaft and is disposed in a magnetic field formed by the permanent magnet;
    a first magnetism collection ring that has an annular first ring portion that surrounds the magnetic yoke and a first magnetism collection portion that includes a portion disposed on a radially outer side of the first ring portion;
    a second magnetism collection ring disposed side by side with the first magnetism collection ring in an axial direction of the second shaft, the second magnetism collection ring having an annular second ring portion that surrounds the magnetic yoke and a second magnetism collection portion that includes a portion disposed on a radially outer side of the second ring portion;
    a housing formed by insert molding so as to integrally surround the first ring portion and the second ring portion; and
    a sensor element that detects magnetism of a magnetic circuit formed by the permanent magnet, the magnetic yoke, the first magnetism collection ring, and the second magnetism collection ring, wherein:
    the housing has a ring portion cover portion that integrally surrounds and holds the first ring portion and the second ring portion, and a sensor cover portion that surrounds and holds the first magnetism collection portion, the second magnetism collection portion, and the sensor element;
    the sensor cover portion houses the sensor element as interposed between the first magnetism collection portion and the second magnetism collection portion, and has an opening portion for insertion of the sensor element into the sensor cover portion covered by a lid portion;
    the sensor element is mounted on a circuit portion formed with a first through hole that penetrates in the axial direction;
    a projection portion is provided inside the sensor cover portion, the projection portion projecting in the axial direction from a bottom wall portion on which the circuit portion is disposed;
    the first magnetism collection portion is formed with a second through hole that penetrates in the axial direction; and
    the projection portion is inserted through both the first through hole of the circuit portion and the second through hole of the first magnetism collection portion.

2. The sensor device according to claim 1, wherein:
    the opening portion of the sensor cover portion opens in the axial direction of the first shaft and the second shaft; and
    the first magnetism collection portion and the second magnetism collection portion face each other in the axial direction inside the sensor cover portion.

3. The sensor device according to claim 2, wherein:
    the first magnetism collection portion is positioned on a side on which the opening portion opens with respect to the second magnetism collection portion; and the first magnetism collection portion is formed separately from the first ring portion, and disposed between end portions of the first ring portion, which has a C-shape, in the circumferential direction.

4. The sensor device according to claim 2, wherein:
the first magnetism collection portion is positioned on a side on which the opening portion opens with respect to the second magnetism collection portion; and
the first magnetism collection portion is formed separately from the first ring portion, and disposed on the radially outer side of the first ring portion.

5. The sensor device according to claim 1, wherein the housing integrally surrounds all of the second magnetism collection portion, the first ring portion, and the second ring portion.

6. The sensor device according to claim 1, wherein:
the bottom wall portion is formed integrally with a placement portion that projects in the axial direction from the bottom wall portion;
the placement portion is formed integrally with the projection portion that projects from a top surface of the placement portion; and
a surface of the circuit portion on which the sensor element is mounted abuts against the top surface of the placement portion.

7. The sensor device according to claim 6, wherein another surface of the circuit portion on which the sensor element is not mounted abuts against a surface of a positioning portion of the first magnetism collection portion on the second magnetism collection portion side.

* * * * *